(12) United States Patent
Lopez et al.

(10) Patent No.: US 10,826,593 B2
(45) Date of Patent: Nov. 3, 2020

(54) METHOD OF PLACING A NODE IN A WIRELESS COMMUNICATION INTO A STANDBY MODE, AS WELL AS THE CORRESPONDING NODE

(71) Applicant: Telefonaktiebolaget LM Ericsson (publ), Stockholm (SE)

(72) Inventors: Miguel Lopez, Solna (SE); Dennis Sundman, Solna (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 208 days.

(21) Appl. No.: 15/773,634

(22) PCT Filed: Mar. 15, 2018

(86) PCT No.: PCT/EP2018/056543
§ 371 (c)(1),
(2) Date: May 4, 2018

(87) PCT Pub. No.: WO2019/174736
PCT Pub. Date: Sep. 19, 2019

(65) Prior Publication Data
US 2020/0059288 A1     Feb. 20, 2020

(51) Int. Cl.
*H04B 7/08*     (2006.01)
*H04W 52/02*    (2009.01)
(Continued)

(52) U.S. Cl.
CPC ........ *H04B 7/082* (2013.01); *H04W 52/0229* (2013.01); *H04W 52/0274* (2013.01); *H04W 84/12* (2013.01); *H04W 88/02* (2013.01)

(58) Field of Classification Search
CPC ......... H04W 52/0229; H04W 52/0274; H04W 88/02; H04W 84/12; H04B 7/082
(Continued)

(56) References Cited

U.S. PATENT DOCUMENTS

2006/0084404 A1* 4/2006 Laroia ................ H04B 1/005
                                                    455/266
2014/0226760 A1* 8/2014 Murakami ............ H04L 5/003
                                                    375/320
(Continued)

FOREIGN PATENT DOCUMENTS

WO    2008108816 A1    9/2008

OTHER PUBLICATIONS

Wilhelmsson, Leif et al., "Variable signal bandwidth of the wake-up signal for enhanced WUR performance", IEEE 802.11-17/1017r2; https://mentor.ieee.org/802.11/dcn/17/11-17-1017-02-00ba-variable-signalbandwidth-of-the-wake-up-signal-for-enhanced-wur-performance.pptx, Jul. 10, 2017, pp. 1-22.

*Primary Examiner* — Phong La
(74) *Attorney, Agent, or Firm* — Murphy, Bilak & Homiller, PLLC

(57) ABSTRACT

A method of placing a node (10) in a wireless communication network into a standby mode, said node (10) comprising a plurality of antennae (13, 14), a primary radio (11) and a secondary radio (12) wherein said primary radio (11) and said secondary radio (12) share at least two of said plurality of antennae (14), said node (10) further comprising a Radio Frequency, RF, switch (15) arranged to connect said secondary radio (12) to any one of said at least two shared antennae (14), wherein said primary radio (11) is arranged to operate within a first frequency band, and wherein said secondary radio (12) is arranged to operate within a second frequency band, wherein said second frequency band is a sub-band of said first frequency band, said method compris- (Continued)

ing the steps of receiving (110) a packet; determining (120) for each of said shared antennae (14) separately, a signal quality indicator of said second frequency band corresponding to said received packet; selecting (130) one of said shared antennae (14) based on said determined signal quality indicators by controlling said RF switch (15) such that said selected antenna connects to said secondary radio (12); placing (140) said node (10) in a standby mode, wherein in said standby mode, said secondary radio (12) is arranged to listen to an activation signal in said second frequency band through said connected antenna for activating said node (10).

17 Claims, 4 Drawing Sheets

(51) Int. Cl.
*H04W 84/12* (2009.01)
*H04W 88/02* (2009.01)

(58) Field of Classification Search
USPC .......................................................... 370/311
See application file for complete search history.

(56) References Cited

U.S. PATENT DOCUMENTS

| | | | |
|---|---|---|---|
| 2014/0301493 A1* | 10/2014 | Govindswamy | H04B 7/0817 375/267 |
| 2015/0365946 A1* | 12/2015 | Luong | H04W 72/0453 370/329 |
| 2016/0127993 A1* | 5/2016 | Wang | H04B 1/0053 370/311 |
| 2016/0255607 A1* | 9/2016 | Warner | H04W 72/046 370/311 |
| 2019/0273569 A1* | 9/2019 | Tian | H04B 7/082 |

\* cited by examiner

METHOD OF PLACING A NODE IN A WIRELESS COMMUNICATION INTO A STANDBY MODE, AS WELL AS THE CORRESPONDING NODE

TECHNICAL FIELD

The present invention relates to the field of wireless communication. More specifically, it relates to a method for reducing power consumption of a node in a wireless communication network by selecting an antenna from a plurality of antennas which is utilized by the node to listen to a wake-up signal.

BACKGROUND

Wake-Up Receivers, WUR, sometimes also referred to as wake-up radios provide a means to significantly reduce power consumption in receivers used in wireless communication. The idea with a WUR is that it can be based on a very basic architecture, as it only needs to be able to detect the presence of a Wake-Up Signal, WUS, but does not need to be used for any data reception.

The WUS usually comprises a Wake-Up Packet, WUP, which is the signal sent to the WUR. A commonly used modulation for the WUP is On-Off keying, OOK. OOK is a binary modulation, wherein a logical one is represented by sending a signal and a logical zero is represented by not sending a signal.

There are currently activities ongoing in the Institute of Electrical and Electronics Engineers, IEEE, 802.11 task group named IEEE 802.11ab to standardize the Physical Layer, PHY, and the Medium Access Control, MAC, layer for a WUR to be used as a companion radio to the 802.11 Primary Communications Radio, PCR, with the mere purpose to significantly reduce the power consumption.

It is proposed to generate the WUS by using an Inverse Fast Fourier Transform, IFFT, as this block is already available in Wi-Fi transceivers supporting established Wi-Fi communication standards such as 802.11 a/g/n/ac. Specifically, an approach discussed for generating the OOK is to use the 13 sub-carriers in the centre, and then populating these with some signal to represent an ON state and to not transmit anything to represent an OFF state. The IFFT has 64 points and is operating at a sampling rate of 20 MHz, and just as for ordinary Orthogonal Frequency Domain Multiplexing, OFDM, a cyclic prefix is added after the IFFT operation in order to keep the OFDM symbol duration used in 802.11 a/g/n/ac and thus be able to spoof legacy stations by prepending a legacy preamble at the beginning of the WUS. In this way, legacy stations will be able to detect the WUS and correctly defer access to the wireless medium.

Due to regulatory requirements, the maximum transmission power that can be used is often limited. Moreover, in some jurisdictions, there are power spectrum density constraints, in addition to power limitations. That is although, a higher total transmission power would be allowed, this cannot be used if the bandwidth of the signal is too small. For this reason, there have been contributions to the IEEE standardization process that suggest that the bandwidth of the transmitted WUS can be adapted based on range requirements such that a wider signal bandwidth may be used when the requirements are harder or when the path loss from the transmitter to the WUR is higher.

It is desirable to achieve equal ranges for the WUR and the PCR, otherwise the wireless device may not be able to achieve the potential power savings provided by a WUR. Owing to factors such as limitations in power consumption at the WUR, loss of frequency diversity in the WUR relative to the PCR, matching the range of the WUR to that of the PCR is a challenge.

A further problem stems from the fact that many modern 802.11 wireless nodes possess two or more RX antennas. In contrast, a WUR, being a relatively lightweight device, will typically operate with just one receiver antenna. This would entail a loss of spatial diversity in the WUR compared to the PCR, further aggravating the range mismatch.

A way to improve spatial diversity at the WUR consists in using antenna selection. The WUR estimates the received signal strength at each antenna and chooses the antenna with the highest signal level. However, this solution is not well suited for WURs for the following reasons:

it requires the WUR to check the signal strength on all the antennas during the WUP preamble. By necessity, this involves switching antennas in the middle of the preamble. This means that the effective length of the preamble used for detection is shortened. The result is a degraded WUP detection performance.

it does not scale well as the number of antennae increases. An 802.11 ac/ax station can have 8 antennae. Having to switch 8 times during the preamble further reduces the effective length of the preamble used for detection.

it introduces additional complexity to the WUR which should ideally be kept as low as possible.

SUMMARY

An object of the invention according to the present disclosure is to provide an antenna selection technique with low cost and complexity that enables the operation of Wake-Up Radio, WUR together with a Primary Communications Radio, PCR. The Antenna selection technique yields substantial spatial diversity gains and alleviates the problem of range mismatch between the PCR and the WUR.

An object of the invention is to reduce the power consumption of a PCR by employing a WUR and by using a suitable antenna selection technique.

In a first aspect of the invention, there is provided a method of placing a node in a wireless communication network into a standby mode, said node comprising a plurality of antennae, a primary radio and a secondary radio wherein said primary radio and said secondary radio share at least two of said plurality of antennae, said node further comprising a Radio Frequency, RF, switch arranged to connect said secondary radio to any one of said at least two shared antennae, wherein said primary radio is arranged to operate within a first frequency band, and wherein said secondary radio is arranged to operate within a second frequency band, wherein said second frequency band is a sub-band of said first frequency band.

The method comprises the steps of receiving, by said primary radio, via said plurality of antennae, a packet, determining, by said primary radio, for each of said shared antennae separately, a signal quality indicator of said second frequency band corresponding to said received packet. The method further comprises the steps of selecting, by said primary radio, one of said shared antennae based on said determined signal quality indicators by controlling said RF switch such that said selected antenna connects to said secondary radio, and placing said node in a standby mode, wherein in said standby mode, said secondary radio is arranged to listen to an activation signal in said second frequency band through said connected antenna for activating said node.

An advantage of the method is that power consumption by the node is significantly reduced by utilizing a secondary radio. A standby mode of the primary radio may also be referred to as a sleep mode or a doze mode. In particular, the Institute of Electrical and Electronics Engineers, IEEE, standard 802.11 refers to such a mode as a sleep mode or a doze mode. In such a standby mode, the primary node enters into a sleep mode wherein the primary radio does not transmit or receive any packets nor does it sense the channel state. Although it is known to employ a secondary radio to "wake-up" a primary radio, it is not known to employ an antenna selection technique wherein the primary radio, before entering the standby mode, selects a particular channel and/or antenna through which the secondary radio may listen to the wake-up signal.

An advantage of such an antenna selection is that this technique yields substantial spatial diversity gains and in turn reduces the problem of range mismatch between the primary radio and the secondary radio. Furthermore, the architecture of the secondary radio may be kept lightweight as it has to listen only to wake-up packets and does not need to be involved in any data transfer.

It may be desirable to keep only the secondary radio active during the standby mode of the node device. Thereby, the power consumption of the node device is greatly reduced. Furthermore, the second frequency band may be defined such that the central frequency of the second frequency band falls within the first frequency band.

According to an embodiment of the present disclosure, the steps of receiving, determining and selecting are performed for each received packet. By doing so, the secondary radio is always attached to the antenna which possesses the best signal quality indicator and therefore has the highest likelihood of receiving a WUS. It is worth mentioning here that the WUS according to this particular embodiment, or any other embodiment disclosed in the present disclosure, may consist of a Wake-Up Packet, WUP. The WUP may be formatted according to the IEEE 802.11 standard.

In an embodiment, the node is arranged to operate in a multi-carrier wireless communication network, wherein said first frequency band comprises a plurality of sub-carriers, and wherein said step of determining comprises selecting sub-carriers from said plurality of sub-carriers which have centre frequencies falling within said second frequency band, and determine for each of said shared antennae separately, a signal quality indicator of said selected sub-carriers corresponding to said received packet.

According to an embodiment, the step of determining comprises transforming a time domain signal corresponding to the received packet to a frequency domain, estimating, in the frequency domain, received signal strengths by aggregating power received in the selected subcarriers for each of the antennae, wherein said step of selecting comprises selecting one of the shared antennae based on the estimated received signal strengths.

The above described embodiments are, for example, directed to Orthogonal Frequency Division Multiplexing, OFDM, signals. Typically, data is sent in OFDM symbols, wherein the OFDM symbols utilize a plurality of sub-carriers, for example 52 sub-carriers, that are each orthogonal to each other. The sub-carriers may be modulated in a variety of manners, for example 16 QAM, 64 QAM, 256 QAM or anything alike.

It was one of the insights of the inventors that the WUS may only utilize a subset of the subcarriers. The WUS may, for example, use 12 or 13 subcarriers. The above lead to the concept that an antenna should be selected for the WUS based on the quality of the signals received in those 12 or 13 subcarriers.

Following the above, the received OFDM time domain signal may be transformed into a frequency domain. The frequency domain signal may thus reflect the energy present in each of the sub-carriers of the OFDM symbol. The antenna having the best, or the most, or having the highest quality, of energy in the respective sub-carriers may thus be selected.

According to an embodiment, the step of determining the signal quality indicators comprises determining received signal strength values for the received packet in the second frequency band for each of the shared antennae separately.

In an embodiment according to the disclosure, the step of selecting comprises selecting the antenna with the highest received signal strength value.

In an embodiment, the step of determining the signal quality indicators comprises determining Signal to Noise Ratios, SNRs, for the received packet in the second frequency band for each of the share antennae separately. As previously described, it may be advantageous to consider either the quality of the received signal or the signal strength of received signal while making a choice. According to this embodiment, the quality of the signal for each antenna is determined. Any other suitable metric such as information theory criterion or the signal to noise plus interference ratio, for example, may also be used to measure the quality of the received signal.

According to an embodiment, the step of selecting comprises selecting the antenna with the highest SNR value. Alternately, the step of selecting may also select the antenna with the best quality metric if any other quality metric for the received signal is determined in the step of determining.

In a second aspect of the invention, there is presented a node in a wireless communication network arranged for operating in an active mode and a standby mode, the node comprising a plurality of antennae, a primary radio and a secondary radio wherein the primary radio and the secondary radio share at least two of the plurality of antennae, the node further comprising a Radio Frequency, RF, switch arranged to connect the secondary radio to any one of the at least two shared antennae, wherein the primary radio is arranged to operate within a first frequency band and the secondary radio is arranged to operate within a second frequency band.

The advantages of the first aspect of the disclosure being a method of placing a node in wireless communication network into a standby are also inherently a part of the second aspect of the disclosure. Furthermore, it is pointed out that although the claims read as if all the modules/equipments according to this second aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipments as such.

The primary radio in the node further comprises receive equipment, arranged to receive a packet via the plurality of antennae, process equipment, arranged to determine a signal quality indicator for each of the shared antennae separately, based on the received packet in the second frequency band, select equipment, arranged to select one of the shared antennae based on the determined signal quality indicator, the select equipment being further arranged to control the RF switch to connect the selected antenna to the secondary radio, and instruct equipment, arranged to instruct the secondary radio to listen to an activation signal in the second frequency band through the selected antenna, the instruct equipment being further arranged to place the node in a standby mode.

According to an embodiment of the second aspect of the present disclosure, the receive equipment is arranged to receive the packet, the process equipment is arranged to determine the signal quality indicator and the select equipment is arranged to select one of the shared antennae for each received packet.

According to a further embodiment of the second aspect of the present disclosure, the node is arranged to operate in a multi-carrier wireless communication network, wherein the first frequency band comprises a plurality of sub-carriers, and wherein the process equipment is further arranged to select sub-carriers from the plurality of sub-carriers which have centre frequencies falling within the second frequency band, and determine for each of the shared antennae separately, a signal quality indicator of the selected sub-carriers corresponding to the received packet.

In an embodiment of the second aspect of the disclosure, the process equipment is further arranged to transform a time domain signal corresponding to the received packet, to a frequency domain, estimate, in the frequency domain, received signal strengths by aggregating power received in the selected subcarriers for each of the antennae wherein the select equipment is arranged to select one of the shared antennae based on the estimated received signal strengths.

In a further embodiment of the second aspect of the present disclosure, the process equipment is arranged to determine received signal strength values for the received packet in the second frequency band for each of the shared antennae separately.

According to an embodiment of the second aspect of the disclosure, the select equipment is arranged to select an antenna with a highest determined received signal strength value.

In an embodiment of the second aspect of the disclosure, the process equipment is arranged to determine a Signal to Noise Ratio, SNR, value based on the received packet in the second frequency band for each of the shared antennae separately.

According to a further embodiment of the second aspect of the disclosure, the select equipment is arranged to select an antenna with a highest determined SNR value.

According to a third aspect of the present disclosure, there is presented a computer readable storage medium comprising instructions which, when loaded on to one or more nodes in a network, is arranged for performing any of the methods as explained above.

In this aspect of the disclosure, a computer readable storage medium is provided with instructions that enable a system onto which said storage medium has been loaded to perform the method according to the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
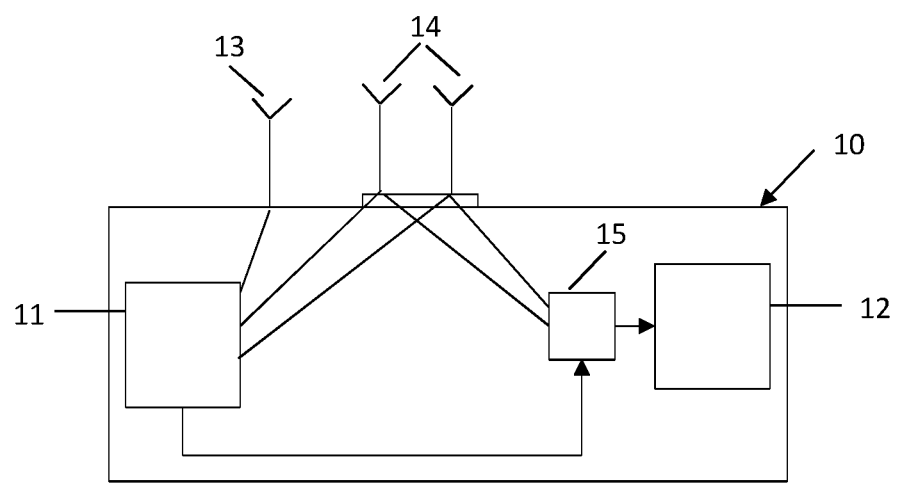
FIG. 1 schematically illustrates a node device according to the present disclosure.

FIG. 1 schematically illustrates a node device 10 according to the present disclosure. The node 10 comprises a primary radio 11 and a secondary radio 12. The primary radio 11 may also be referred to as a Primary Communications Radio, PCR. The primary radio 11 is arranged for communicating with the other nodes in a wireless communication network of which the node 10 is a part. The primary radio 11 has a more complex architecture since it is also involved in data transfer. The primary radio is accountable for most of the power consumption in the node 10. Hence, in order to reduce the power consumption of the node 10, it may be desirable to place the primary radio 11 in a standby mode, wherein the primary radio is not sending data packets to or receiving data packets from other nodes in the communication network.

The node 10 also comprises a secondary radio 12. The secondary radio 12 may also be referred to as a Wake-Up Radio, WUR. The main purpose of the secondary radio 12 is only to listen to Wake-Up Signal, WUS, and to activate the primary radio 11 such that the primary radio 11 is brought out of the standby mode. For this reason, the secondary radio 12 has a simple architecture and consumes very little power. The node 10 comprises a plurality of antennae 13, 14 which is used to communicate with other nodes in the communication network.

The primary radio 11 and the secondary radio 12 share at least two antennae 14 comprised in the plurality of antennae 13, 14. The primary radio 11 is arranged to select one antenna among the shared antennas 14 and the secondary radio 12 listens to a WUS through the selected antenna. The primary radio informs an Radio Frequency, RF, switch 15 of its selection and the RF switch 15 is arranged to connect the secondary radio 12 to the selected antenna.

Figure 2:
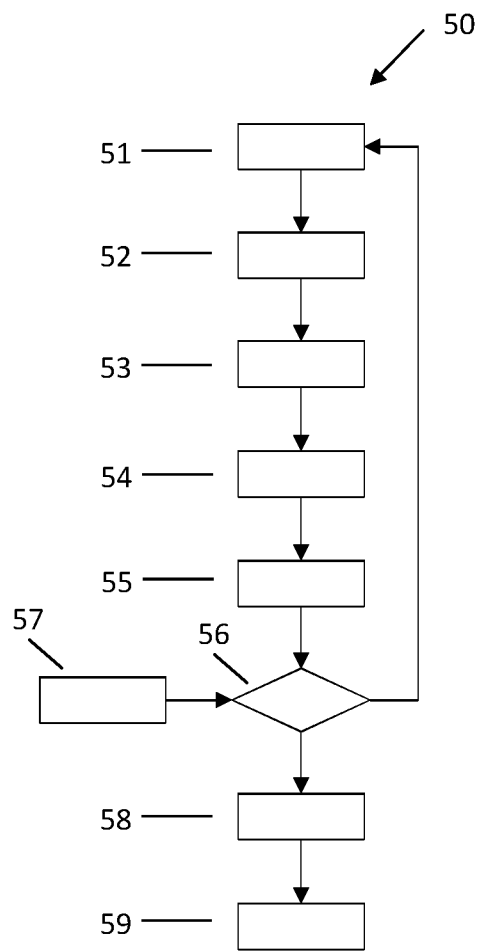
FIG. 2 schematically illustrates a method of antenna selection according to the present disclosure.

FIG. 2 schematically illustrates a method 50 of antenna selection according to the present disclosure. In the method 50, the primary radio 11 receives 51 a packet of data. As is commonly understood, the packet of data is usually a time-domain signal. Upon reception of the packet, the primary radio 11 transforms 52 the time-domain signal into frequency domain signal. Such a transformation may involve employing Discrete Fourier Transform, DFT, or other suitable techniques, for example. The primary radio 11 subsequently selects 13 sub-carriers in the centre of the RF channel. The WUS is carried over the selected 13 sub-carriers. For each shared antenna 14, the primary radio 11 then computes 54 received signal strength using only the selected sub-carriers. For each antenna branch, a received signal strength may be computed 53 using only the selected sub-carriers. The antenna with the highest signal strength may be selected 54.

In a further step 55, the primary radio 11 selects an antenna branch from the plurality of shared antennas 14 with highest computed received signal strength. The node then decides 56 whether the primary radio 11 needs to be turned off or put into a standby mode. In order to do so, the current status of the primary radio 11 is determined 57. If the primary radio 11 needs to remain active, then it continues to receive 51 incoming packets and may perform the steps described above for each incoming packet. If however, it is determined that the primary radio 11 may be turned off or entered into a standby mode, then the primary radio 11 informs 58 the RF switch 15 of its selection. The RF switch 15 then connects the selected antenna to the secondary radio 12. Thereafter, the primary radio is turned off 59.

In an embodiment of the present disclosure, the primary radio 11 sets the RF switch 15 so that the secondary radio 12 is connected to the antenna with the highest estimated signal strength, after performing the determination of the antenna branch for each received packet. That is, the primary radio 11 need not store this information in memory nor wait for the command to turn itself off. Rather the state of the RF switch 15 is set for each received packet after performing the antenna selection.

In an embodiment of the present disclosure, the primary radio 11 selects the antenna branch with the highest signal quality. In order to achieve this, in step 54, a signal quality indicator of the received packet is determined and an antenna branch that is associated with the highest signal quality indicator is selected in step 55. The rest of the procedure may be identical. The quality of the signal may be measured in terms of Signal to Noise Ratio, SNR, or according to an information theory criterion such as mutual information, for example. Regardless of the way to estimate the quality of an antenna branch, the choice is based on statistics derived from the 13 subcarriers used by the WUS.

It may be possible that the time elapsed between the setting of the RF switch 15 and the reception of a WUS can be considerably larger than the coherence time of the channel wherein the coherence time for a communication channel may be defined as the time duration over which the channel impulse response is considered to be not varying. In this case, the invention results in a random choice of the antenna branch, as the selection is made on outdated information. Random selection or a fixed antenna selection have the same statistical properties, so that the method according to the present disclosure results in no losses compared to a fixed antenna selection.

On the other hand, many applications of IEEE 802.11 correspond to semi-static situations where the antenna selection by the primary radio 11 remains valid over time intervals as long as the sleeping cycles of the primary radio 11 which can range from the order of tens of milliseconds to a few seconds. In this case, an antenna selection technique brings about performance gains at a very low cost and with little increase in hardware or algorithmic complexity.

In the above mentioned description, it is mentioned that the WUS is transmitted in the centre of the 20 MHz channel using a 64 point Fast Fourier Transform, FFT, and with a bandwidth corresponding to 13 subcarriers. The invention is not limited to this case. It does not matter wherein the 20 MHz channel, the WUS is transmitted, or which subcarrier spacing is used. The primary radio 11 will just measure the power in the corresponding bandwidth. Similarly, if the bandwidth of the WUS would be increased, the bandwidth used by the primary radio 11 for selecting which antenna to use for the secondary radio 12 would be increased in the same way.

Figure 3:
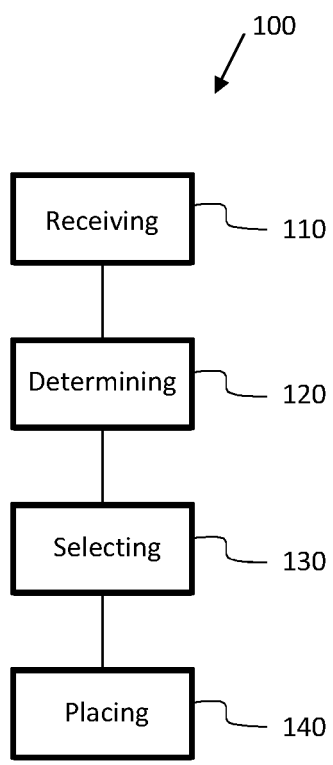
FIG. 3 schematically illustrates a method according to the present disclosure.

FIG. 3 schematically illustrates a method 100 according to the present disclosure. In a first step of receiving 110, the primary radio 11 receives via the plurality of antennae 13, 14, a packet. In a subsequent step of determining 120, the primary radio 11 determines for each of the shared antennae 14 separately, a signal quality indicator of the second frequency band corresponding to the received packet.

In a further step of selecting 130, the primary radio 11 selects one of the shared antennae 14 based on the determined signal quality indicators by controlling the RF switch 15 such that the selected antenna connects to the secondary radio 12. Lastly, in a step of placing 140, the node 10 is placed in a standby mode, wherein in the standby mode, the secondary radio 12 is arranged to listen to an activation signal in the second frequency band through the connected antenna for activating the node 10. It may be noted that a standby mode of the node 10 is activated when the primary radio 11 is placed in a standby mode.

Figure 4:
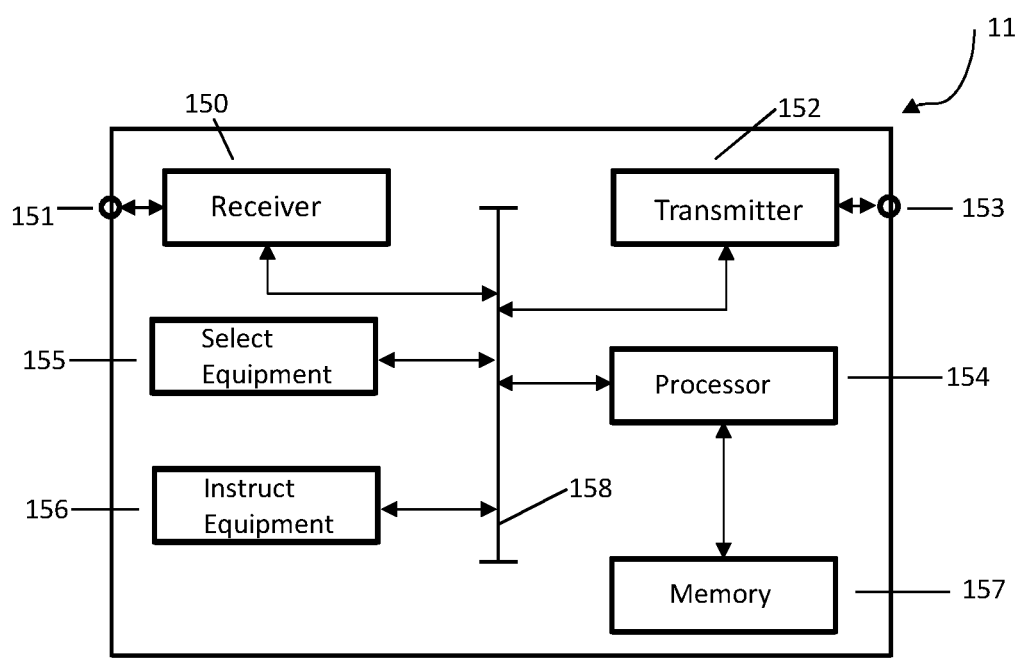
FIG. 4 schematically illustrates a primary radio device according to the present disclosure.

FIG. 4 schematically illustrates a primary radio 11 according to the present disclosure. The primary radio 11 comprises receiver equipment 150, 151 arranged to receive incoming data packets from other nodes in the communication network. The receiver equipment 150, 151 may, in turn, be connected to any pf the plurality of antennae 13, 14, in order to achieve communication. Furthermore, the receiver equipment 150, 151 may also be arranged to receive an activation signal from the secondary radio 12 which indicates to the primary radio 11 that the standby mode needs to be terminated. Alternatively, a bus or an internal interface is present in the device linking the secondary radio to the primary radio. The primary radio 11 also comprises of transmitter equipment 153, 154 arranged for sending data to other nodes in the communication network. The transmitter equipment 153, 154 may also be in turn connected to one or more of the plurality of antennae 13, 14 in order to transmit data and communicate with other nodes in the network.

The processor 154 is arranged to determine a signal quality indicator based on the packet received by the receiver 150, 151. As described earlier, the signal quality indicator may be an indication of the received signal strength or an indication of the received signal quality such as a Signal to Noise Ratio, SNR. Based on the determined signal quality indicator, the select equipment 155 selects one antenna from the at least two shared antennae 14. The instruct equipment 156 instructs an external RF switch 15 such that the selected antenna is connected to the secondary radio 12 through the RF switch 15.

The primary radio 11 further comprises memory 157 which may be arranged to store a computer program product which when executed by the processor 154 causes the primary radio 11 to perform a method according to the present disclosure.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Within the scope of the present disclosure, a plurality of antenna may be referred to either as "antennae" or "antennas".

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of placing a node in a wireless communication network into a standby mode, the node comprising a plurality of antennae, a primary radio arranged to operate within a first frequency band, and a secondary radio arranged to operate within a second frequency band that is a sub-band of the first frequency band, wherein the primary and secondary radios share at least two of the plurality of antennae, the node further comprising a radio frequency (RF) switch arranged to connect the secondary radio to any one of the at least two shared antennae, the method comprising:
   receiving, by the primary radio via the plurality of antennae, a packet;
   determining, by the primary radio and for each one of the shared antennae, a signal quality indicator of the second frequency band corresponding to the received packet;
   selecting, by the primary radio, one of the shared antennae based on the determined signal quality indicators by controlling the RF switch such that the selected shared antenna connects to the secondary radio;
   placing the node in a standby mode, wherein the secondary radio is arranged to listen, via the selected shared antenna connected to the secondary radio, to an activation signal in the second frequency band for activating the node.

2. The method according to 1, wherein the operations of receiving, determining, and selecting are performed for each of a plurality of packets.

3. The method according to claim 1, wherein:
   the node is arranged to operate in a multi-carrier wireless communication network;
   the first frequency band comprises a plurality of sub-carriers; and
   determining the signal quality indicators by the primary radio comprises:
      selecting sub-carriers from the plurality of sub-carriers which have center frequencies within the second frequency band; and
      determining, for each one of the shared antennae, a signal quality indicator of the selected sub-carriers corresponding to the received packet.

4. The method according to claim 3, wherein:
   determining the signal quality indicators by the primary radio further comprises:
      transforming a time domain signal corresponding to the received packet to a frequency domain, and
      estimating, in the frequency domain, received signal strengths by aggregating power received in the selected subcarriers for each of the antennae; and
   selecting one of the shared antennae is based on the estimated received signal strengths.

5. The method according to claim 1, wherein the signal quality indicator for each one of the shared antennae comprises a received signal strength value.

6. The method according to claim 5, wherein selecting one of the shared antennae comprises selecting the antenna associated with the highest of the received signal strength values.

7. The method according claim 1, wherein the signal quality indicator for each one of the shared antennae comprises a Signal to Noise Ratio (SNR) value.

8. The method according to claim 7, wherein selecting one of the shared antennae comprises selecting a shared antenna associated with the highest of the SNR values.

9. A node in a wireless communication network configurable to operate in an active mode and a standby mode, the node comprising:
   a primary radio arranged to operate within a first frequency band;
   a secondary radio arranged to operate within a second frequency band that is a sub-band of the first frequency band;
   a plurality of antenna configured such that at least two of the plurality are shared by the primary radio and the secondary radio;
   a radio frequency (RF) switch arranged to connect the secondary radio to any one of the at least two shared antennae;
   at least one processor; and
   at least one memory storing computer-executable instructions that, when executed by the at least one processor, configure the node to:
      receive, by the primary radio via the plurality of antennae, a packet;
      determine, by the primary radio and for each one of the shared antennae, a signal quality indicator of the second frequency band corresponding to the received packet;
      select, by the primary radio, one of the shared antennae based on the determined signal quality indicators by controlling the RF switch such that the selected shared antenna connects to the secondary radio; and
      place the node in a standby mode, and configure the secondary radio listen, via the selected shared antenna connected to the secondary radio, to an activation signal in the second frequency band for activating the node.

10. The node according to claim 9, wherein execution of the instructions configures the node to perform the receive, determine, and select operations for each of a plurality of packets.

11. The node according to claim 9, wherein:
   the node is arranged to operate in a multi-carrier wireless communication network;
   the first frequency band comprises a plurality of sub-carriers; and
   execution of the instructions configures the node to determine the signal quality indicators by:
      selecting sub-carriers from the plurality of sub-carriers which have center frequencies within the second frequency band; and
      determining, for each one of the shared antennae, a signal quality indicator of the selected sub-carriers corresponding to the received packet.

12. The node according to claim 11, wherein execution of the instructions configures the node to:
   determine the signal quality indicators by:
      transforming a time domain signal corresponding to the received packet to a frequency domain, and
      estimating, in the frequency domain, received signal strengths by aggregating power received in the selected subcarriers for each of the antennae; and
   select one of the shared antennae based on the estimated received signal strengths.

13. The node according to claim 9, wherein the signal quality indicator for each one of the shared antennae comprises a received signal strength value.

14. The node according to claim 13, wherein execution of the instructions configures the node to select an antenna associated with the highest of the received signal strength values.

15. The node according to claim 9, wherein the signal quality indicator for each one of the shared antennae comprises a Signal to Noise Ratio (SNR) value.

16. The node according to claim 15, wherein execution of the instructions configures the node to select one of the shared antennae by selecting a shared antenna associated with the highest of the SNR values.

17. A non-transitory, computer-readable storage medium comprising computer-executable instructions that, when executed by one or more nodes in a wireless communication network, configure the one or more nodes to perform operations corresponding to the method of claim 1.

* * * * *

UNITED STATES PATENT AND TRADEMARK OFFICE
CERTIFICATE OF CORRECTION

PATENT NO. : 10,826,593 B2  
APPLICATION NO. : 15/773634  
DATED : November 3, 2020  
INVENTOR(S) : Lopez et al.

Page 1 of 1

It is certified that error appears in the above-identified patent and that said Letters Patent is hereby corrected as shown below:

In the Specification

In Column 2, Line 11, delete "consists in" and insert -- consists of --, therefor.

In Column 4, Line 49, delete "standby are" and insert -- standby mode are --, therefor.

In Column 4, Lines 60-61, delete "receive equipment," and insert -- receiver equipment, --, therefor.

In Column 5, Line 8, delete "receive equipment" and insert -- receiver equipment --, therefor.

In Column 6, Line 40, delete "an Radio" and insert -- a Radio --, therefor.

In Column 8, Line 17, delete "any pf" and insert -- any of --, therefor.

In Column 8, Line 25, delete "transmitter equipment 153, 154" and insert -- transmitter equipment 152, 153 --, therefor.

In Column 8, Lines 26-27, delete "transmitter equipment 153, 154" and insert -- transmitter equipment 152, 153 --, therefor.

In the Claims

In Column 9, Line 65, in Claim 7, delete "The method according claim 1," and insert -- The method according to claim 1, --, therefor.

In Column 10, Line 34, in Claim 9, delete "secondary radio listen," and insert -- secondary radio to listen, --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*